United States Patent [19]

Schelhas et al.

[11] 4,347,026
[45] Aug. 31, 1982

[54] RETAINING MEANS

[75] Inventors: Peter Schelhas, Stuttgart; Walter Schlott, Kernen, both of Fed. Rep. of Germany

[73] Assignee: Robert Bosch GmbH, Stuttgart, Germany

[21] Appl. No.: 99,436

[22] Filed: Dec. 3, 1979

[30] Foreign Application Priority Data

Feb. 7, 1979 [DE] Fed. Rep. of Germany ....... 2904537

[51] Int. Cl.³ ............................................. F16B 39/34
[52] U.S. Cl. ................................... 411/299; 411/302
[58] Field of Search .................... 151/7, 26, 25 R, 69, 151/30; 85/8.8; 411/299, 262, 302, 301, 304, 314, 313, 324, 259

[56] References Cited

U.S. PATENT DOCUMENTS

| | | | |
|---|---|---|---|
| 1,782,196 | 11/1930 | Dalton | 85/8.8 X |
| 1,809,620 | 6/1931 | Cole | 151/7 |
| 2,021,241 | 11/1935 | Mall | 85/8.8 X |
| 2,107,550 | 2/1938 | Schmidt | 151/7 X |
| 2,162,849 | 6/1939 | Landis | 85/8.8 X |
| 2,381,206 | 8/1945 | Clayson | 151/30 X |
| 2,760,258 | 8/1956 | Rieger | 85/8.8 X |
| 2,948,317 | 8/1960 | Munro | 85/8.8 X |

FOREIGN PATENT DOCUMENTS

| | | | |
|---|---|---|---|
| 708740 | 7/1941 | Fed. Rep. of Germany | 85/8.8 |
| 139519 | 11/1950 | United Kingdom | 151/7 |

Primary Examiner—Ramon S. Britts
Attorney, Agent, or Firm—Stanley M. Welsh

[57] ABSTRACT

A retaining means is disclosed which utilizes a resilient ring placed in an eccentric groove which partially penetrates its supporting member. The ring extends through the support member and bears against the member to be retained. Thus a constant retaining force is applied to the restrained member which allows the member to be adjusted without first removing the ring. The restraining force is sufficient to prevent unwanted movement of the restrained member when subjected to a vibrational environment.

5 Claims, 2 Drawing Figures

RETAINING MEANS

BACKGROUND OF THE INVENTION

The invention relates to a retaining means for adjustable element. Retaining means for adjustable elements are already known; however, they have the disadvantage that upon each adjustment of the moveable element, the retaining means must be replaced by a new one, or additional steps are required after the adjustment has taken place for loosening the retaining means and subsequently tightening it again.

OBJECT AND SUMMARY OF THE INVENTION

The retaining means for an adjustable element has the advantage that it not only retains the position of the adjustable element, but also without additional steps provides an infinitely variable adjustment capability for the adjustable element so that it can be economically manufactured in mass production. It is a further advantage that the retaining element is not destroyed during the adjustment procedure and that the least possible structural space is required for the adjustment retaining means.

It is particularly advantageous furthermore to use a conventional type-snag ring as the retaining element.

The use of the retaining means is also advantageous when a screw acts as the adjustable element where the retainer bears in part against the sides of the thread, whereupon a virtually constant torque is required for adjustment of the screw over the entire adjustment range.

The invention will be better understood as well as further objects and advantages thereof become more apparent from the ensuing detailed description of a preferred embodiment taken in conjunction with the drawing.

DESCRIPTION OF THE PREFERRED EMBODIMENT

Figure 1:
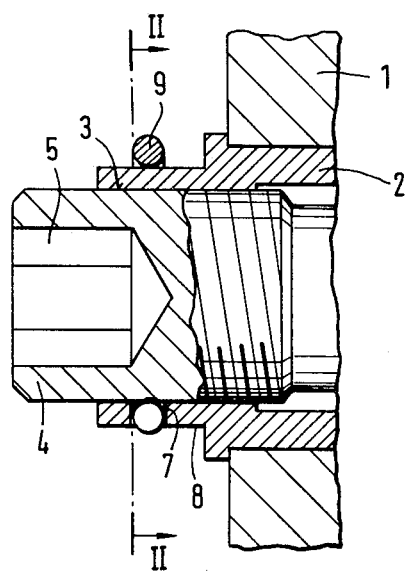
FIG. 1 is a sectional view of the retaining means for an adjustable element.
Figure 2:
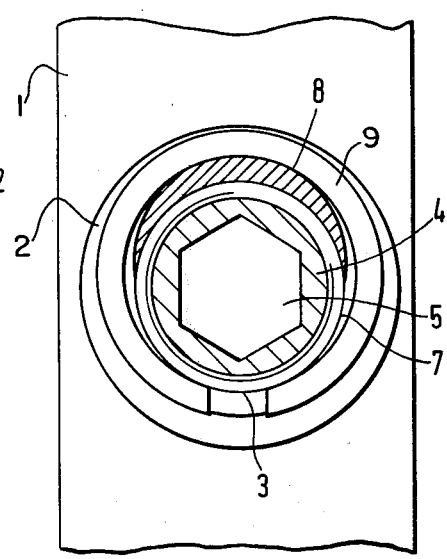
FIG. 2 is a section taken along the line II—II of FIG. 1.

In FIGS. 1 and 2, an element 1 is shown in which a guide body 2 is fixed. The guide body 2 has a guide opening 3 passing through it in the axial direction, which in the present embodiment is a threaded opening. In the illustrated embodiment, a screw 4 acts as the adjustable element which is provided with a thread corresponding to the thread in the guide opening 3 and has an external hexagonal opening 5 for the purpose of adjustment. The screw 4 is supported in a rotatable and thus also displaceable manner within the guide opening 3. In its portion lying outside the element 1, the guide body 2 has at least one retaining groove 7, provided in the periphery of the guide body which at least partially engages the outer circumference 8 of the guide body 2 and partially extends from the outer circumference 8 to the guide opening 3. For the purpose of retaining the position of the screw 4, a resilient retaining element 9, preferably a conventional, industrial-norm type of snap ring 9, can now be placed over the outer circumference 8 of the gide body 2. This snap ring 9 then engages the securing groove 7 and bears against the sides of the thread of the screw 4. As is shown for the illustrated embodiment, the outer circumference 8 of the guide body 2 may be embodied as concentric with the guide opening 3 and the retainer groove 7 may be embodied as eccentric to the guide opening 3. The illustrated embodiment of an adjustment retaining means assures a narrowly defined torque range of 5 to 25 Ncm and assures maintaining the adjustment when subjected to a vibration acceleration of up to approximately 600 m/sec$^2$.

Thus the adjustment retaining means in accordance with the invention is also suitable for use, for instance, in a motor vehicle where there are adjustable elements at various locations in the internal combustion engine and the fuel supply system, which are intended to be adjusted at predetermined intervals for the purpose of initial setting or correction of the system, without requiring the destruction of the retaining element to attain this end, or without requiring additional steps for the purpose of resecuring the elements. Through the spring force of the snap ring 9, a braking torque is exerted on the thread sides of the screw 4, while the coefficient of friction may be held constant over the entire adjustment range, for example, by means of oiling the thread.

The foregoing relates to a preferred exemplary embodiment of the invention, it being understood that other embodiments and variants thereof are possible within the spirit and scope of the invention, the latter being defined by the appended claims.

What is claimed and desired to be secured by Letters Patent of the United States is:

1. A retainer for an adjustable element comprising:
   a first member of generally cylindrical shape having a longitudinal axis with an opening therethrough along said axis, a circumferentially extending variable depth groove formed in a portion of said first member in a circumferential direction, said groove being formed eccentric to the axis of the opening and with a portion of said groove penetrating into said opening along at least one location thereof;
   a second member, supporting in the opening of said first member and being adjustable axially therein with respect to said first member;
   ring shaped resilient means arranged in said groove of said first member, said resilient means having a portion thereof extending into said axial opening at said at least one location and in frictional contact with said second member.

2. The retainer of claim 1 wherein said first member is provided with internal threads and said second member is provided with external threads in engagement with the threads of said first member for adjusting said second member with respect to said first member.

3. The retainer of claim 2 wherein the resilient means is in frictional contact with the threads of said second member.

4. The retainer of claim 1 wherein the resilient means is a resilient snap ring.

5. The retainer of claim 4 wherein the resilient means is a metallic snap ring.

* * * * *